(12) United States Patent
Kong et al.

(10) Patent No.: US 10,935,706 B2
(45) Date of Patent: Mar. 2, 2021

(54) CURVED LIQUID CRYSTAL DISPLAY DEVICE AND COLOR FILTER SUBSTRATE FOR THE SAME

(71) Applicant: LG Display Co., Ltd., Seoul (KR)

(72) Inventors: In-Yeong Kong, Gyeonggi-do (KR); Do-Sung Kim, Gyeonggi-do (KR); Hee-Young Chae, Gyeonggi-do (KR); Se-Hong Park, Gyeonggi-do (KR); Jong-Sin Park, Gyeonggi-do (KR); Ja-Young Pyun, Seoul (KR); Dong-Yoon Lee, Seoul (KR); Jae-Woong YouN, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 130 days.

(21) Appl. No.: 16/195,605

(22) Filed: Nov. 19, 2018

(65) Prior Publication Data

US 2019/0086594 A1    Mar. 21, 2019

Related U.S. Application Data

(62) Division of application No. 14/706,155, filed on May 7, 2015, now Pat. No. 10,168,458.

(30) Foreign Application Priority Data

Jun. 13, 2014 (KR) .......................... 10-2014-0072282

(51) Int. Cl.
G02F 1/1333    (2006.01)
G02B 5/20    (2006.01)
(Continued)

(52) U.S. Cl.
CPC ....... *G02B 5/201* (2013.01); *G02F 1/133512* (2013.01); *G02F 1/136286* (2013.01)

(58) Field of Classification Search
None
See application file for complete search history.

(56) References Cited

U.S. PATENT DOCUMENTS

2008/0137013 A1    6/2008 Kamoshida
2015/0109565 A1*   4/2015 Takeda .............. G02F 1/133707
                                                    349/106
2015/0302808 A1   10/2015 Wang et al.

FOREIGN PATENT DOCUMENTS

CN    101201486 A    6/2008
CN    101464582 A    6/2009
(Continued)

OTHER PUBLICATIONS

The First Notification of Office Action dated Jan. 4, 2018 from the State Intellectual Property Office of China in related Chinese application No. 201510323589.3.

*Primary Examiner* — Richard H Kim
(74) *Attorney, Agent, or Firm* — Morgan, Lewis & Bockius LLP

(57) ABSTRACT

A curved liquid crystal display device includes first and second substrates facing each other and including a central region and a peripheral region; a plurality of data lines disposed on the first substrate and being spaced apart from each other by the same distance; a plurality of gate lines disposed on the first substrate and crossing the plurality of data lines; a pixel electrode disposed on the first substrate; a common electrode on the first substrate or the second substrate; a plurality of black matrixes disposed on the second substrate, a distance between adjacent black matrixes in the central region being smaller than a distance between adjacent black matrixes in the peripheral region; and a liquid crystal layer disposed between the first and second substrates.

8 Claims, 10 Drawing Sheets

(51) Int. Cl.
*G02F 1/1362* (2006.01)
*G02F 1/1335* (2006.01)

(56) References Cited

FOREIGN PATENT DOCUMENTS

| | | |
|---|---|---|
| CN | 103424916 A | 12/2013 |
| JP | 2007333818 A | 12/2007 |

\* cited by examiner

CURVED LIQUID CRYSTAL DISPLAY DEVICE AND COLOR FILTER SUBSTRATE FOR THE SAME

This application is a Divisional of U.S. patent application Ser. No. 14/706,155, filed May 7, 2015, which claims the benefit of Korean Patent Application No. 10-2014-0072282 filed in Korea on Jun. 13, 2014, both of which are hereby incorporated by reference.

BACKGROUND OF THE INVENTION

Field of the Invention

The present invention relates to a liquid crystal display (LCD) device and more particularly to a curved LCD device and a color filter substrate for the curved LCD device.

Discussion of the Related Art

As society has entered in earnest upon an information age, various display devices for displaying images are required.

Flat panel display devices, such as an LCD device, a plasma display panel (PDP) and an organic light emitting diode (OLED) display device, have excellent capabilities of a thin profile, light weight and low power consumption, and so on, relative to a cathode ray tube (CRT) device and are widely researched instead of the CRT display.

Among these devices, since the LCD device has advantages in the weight, the size and the power consumption, the LCD device is widely used.

The LCD device includes a liquid crystal panel and a backlight unit. The backlight unit is disposed under the liquid crystal panel and provides the light to the liquid crystal panel. The LCD device uses optical anisotropy and polarization properties of liquid crystal molecules in the liquid crystal panel. The liquid crystal molecules have a definite alignment direction as a result of their thin and long shapes. The alignment direction of the liquid crystal molecules can be controlled by application of an electric field across the liquid crystal molecules.

As the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity.

Since the LCD device including a thin film transistor (TFT) as a switching element, referred to as an active matrix LCD (AM-LCD) device, has excellent characteristics of high resolution and displaying moving images, the AM-LCD device has been widely used.

On the other hand, there is a distance deviation in the related art LCD device.

Namely, with reference to FIG. 1, which shows the related art LCD device, there is a difference between a first distance "a" from a main viewing point to a center of the LCD device 10 and a second distance "b" from the main viewing point to a side of the LCD device 10. Namely, there is the distance deviation in the flat type display device.

SUMMARY

Accordingly, the present invention is directed to a curved LCD device and a color filter substrate for the same that substantially obviate one or more of the problems due to limitations and disadvantages of the related art.

An object of the present invention is to provide a curved LCD device and a color filter substrate for the same that is capable of preventing a distance deviation.

An object of the present invention is to provide a curved LCD device and a color filter substrate for the same that is capable of preventing a light leakage problem without aperture ratio decrease.

An object of the present invention is to provide a curved LCD device and a color filter substrate for the same that is capable of preventing a color mixture problem without transmittance decrease.

An object of the present invention is to provide a curved LCD device and a color filter substrate for the same that is capable of preventing a color mixture problem, a light leakage problem and a transmittance decrease problem without aperture ratio decrease.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a curved liquid crystal display device comprises first and second substrates facing each other and including a central region and a peripheral region; a plurality of data lines disposed on the first substrate and being spaced apart from each other by the same distance; a plurality of gate lines disposed on the first substrate and crossing the plurality of data lines; a pixel electrode disposed on the first substrate; a common electrode on the first substrate or the second substrate; a plurality of black matrixes disposed on the second substrate, a distance between adjacent black matrixes in the central region being smaller than a distance between adjacent black matrixes in the peripheral region; and a liquid crystal layer disposed between the first and second substrates.

In another aspect, a curved liquid crystal display device comprises first and second substrates facing each other and including a central region and a first peripheral region; a plurality of data lines disposed on the first substrate and being spaced apart from each other by a first distance; a plurality of gate lines disposed on the first substrate and crossing the plurality of data lines; a pixel electrode disposed on the first substrate; a common electrode on the first substrate or the second substrate; a black matrix disposed on the second substrate and including first black matrixes in the central region and second black matrixes in the first peripheral region; and a liquid crystal layer disposed between the first and second substrates, wherein the first black matrixes are spaced apart from each other by a second distance, and the second black matrixes are spaced apart from each other by a third distance being smaller than the second distance.

In another aspect, the present invention provides a curved liquid crystal display device including first and second substrates facing each other and including a central region and a peripheral region; a plurality of gate lines disposed on the first substrate; a plurality of data lines disposed on the first substrate and crossing the plurality of gate lines; a pixel electrode disposed on the first substrate; a common electrode on the first substrate or the second substrate; a black matrix disposed on the second substrate and corresponding to the plurality of data lines; a color filter layer disposed on the second substrate, a width of the color filter being decreased from the central region to the peripheral region; and a liquid crystal layer disposed between the first and second substrates.

In another aspect, a curved liquid crystal display device comprises first and second substrates facing each other and including a central region and a first peripheral region; a plurality of gate lines disposed on the first substrate; a plurality of data lines disposed on the first substrate and crossing the plurality of data lines; a pixel electrode disposed on the first substrate; a common electrode on the first substrate or the second substrate; a black matrix disposed on the second substrate and corresponding to the plurality of data lines; a color filter layer disposed on the second substrate and including a first color filter in the central region and a second color filter in the first peripheral region; and a liquid crystal layer disposed between the first and second substrates, wherein a first width of the first color filter is larger than a second width of the second color filter.

In another aspect, a color filter substrate for a curved liquid crystal display device comprises a substrate including a central region and a first peripheral region; first black matrixes in the central region and spaced apart from each other by a first distance along a major axis of the substrate; second black matrixes in the first peripheral region and spaced apart from each other by a second distance, which is smaller than the first distance, along the major axis of the substrate; and a color filter layer between the first and second black matrixes.

In another aspect, a color filter substrate for a curved liquid crystal display device comprises a substrate including a central region and a first peripheral region; a black matrix on the substrate and including an opening; and a color filter layer in the opening and including a first color filter in the central region and a second color filter in the first peripheral region, wherein the first color filter has a first width being larger than a second width of the second color filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the preferred embodiments, examples of which are illustrated in the accompanying drawings.

Figure 1:
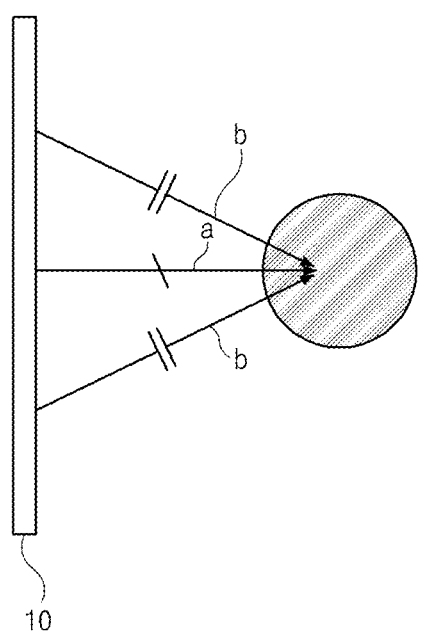
FIG. 1 shows the related art LCD device.
Figure 2:
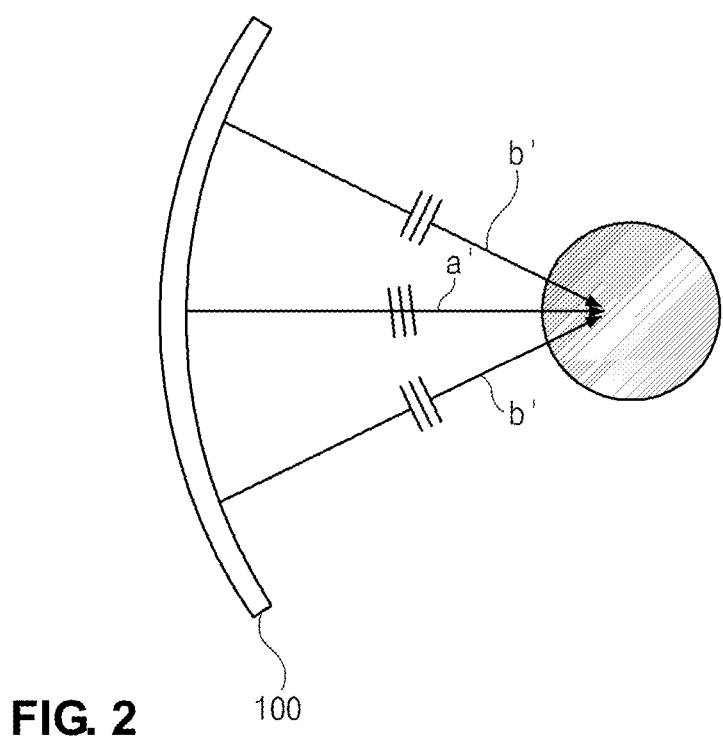
FIG. 2 is a schematic perspective view of a curved LCD device according to a first embodiment of the present invention.

FIG. 2 is a schematic perspective view of a curved LCD device according to a first embodiment of the present invention.

As shown in FIG. 2, a curved LCD device 100 has a curved shape. Namely, a flat display device is curved by a pre-determined curvature with respect to a center of the display device to be curved shape.

Accordingly, a first distance "a'" from a main viewing point to a center of the LCD device 100 is substantially equal to a second distance "b'" from the main viewing point to a side of the LCD device 100 such that there is no distance deviation. As a result, a sense of immersion is improved.

Figure 3:
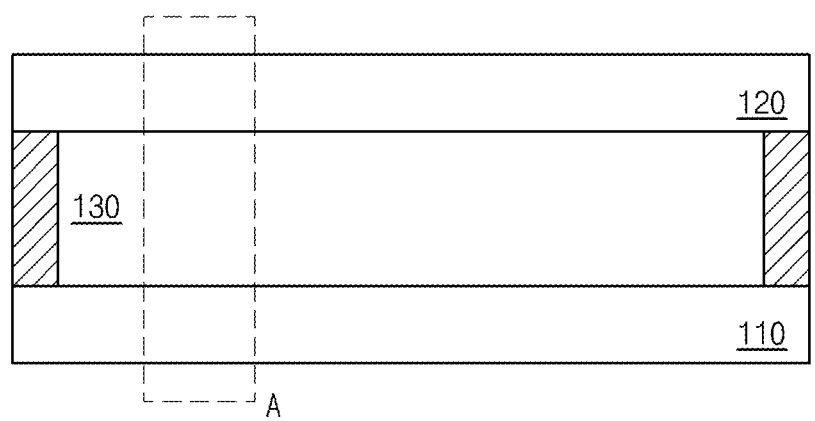
FIG. 3 is a schematic cross-sectional view showing a flat state of a curved LCD device according to the first embodiment of the present invention.
Figure 4:
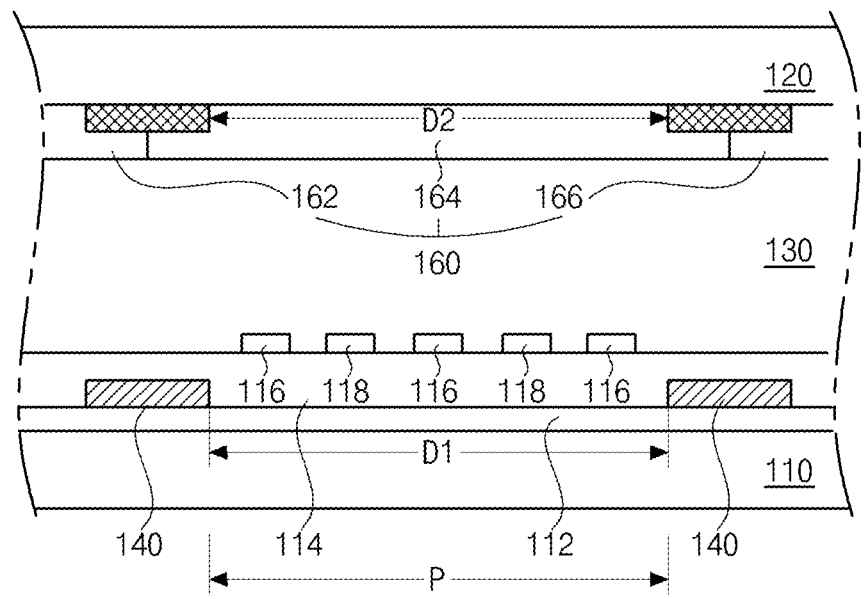
FIG. 4 is an enlarged view of "A" part in FIG. 3.
Figure 5:
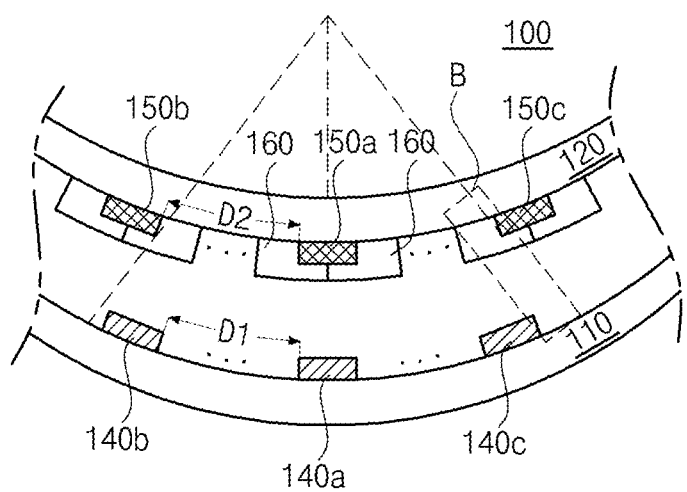
FIG. 5 is a schematic cross-sectional view showing a curved state of a curved LCD device according to the first embodiment of the present invention.

FIG. 3 is a schematic cross-sectional view showing a flat state of a curved LCD device according to the first embodiment of the present invention, and FIG. 4 is an enlarged view of "A" part in FIG. 3. FIG. 5 is a schematic cross-sectional view showing a curved state of a curved LCD device according to the first embodiment of the present invention.

A curved LCD device 100 according to the first embodiment of the present invention includes first and second substrates 110 and 120, which face each other, and a liquid crystal layer 130 therebetween.

A flat state of the LCD device in FIG. 3 is transformed into a curved state of the LCD device in FIG. 5 such that the curved LCD device 100 is provided.

With reference to FIG. 4, a data line 140, a common electrode 116, a pixel electrode 118 are formed on the first substrate 110 as a lower substrate, and a black matrix 150 and a color filter layer 160 are formed on the second substrate 120 as an upper substrate.

In more detail, a gate line (not shown), which extends along a direction, and a gate electrode (not shown), which is connected to the gate line, are formed on the first substrate 110, and a gate insulating layer 112 is formed to cover the gate line and the gate electrode. A common line (not shown) may be further formed to be parallel to the gate line.

In addition, a semiconductor layer (not shown) corresponding to the gate electrode is formed on the gate insulating layer 112, and a source electrode (not shown) and a drain electrode (not shown), which are spaced apart from each other, are formed on the semiconductor layer. For example, the semiconductor layer may include an active layer of intrinsic amorphous silicon and an ohmic contact layer of impurity-doped amorphous silicon. Alternatively, the semiconductor layer may be formed of an oxide semiconductor material.

The gate electrode, the gate insulating layer, the semiconductor layer, the source electrode and the drain electrode constitute a thin film transistor (TFT).

Moreover, the data line 140 is formed on the gate insulating layer 112. The data line 140 crosses the gate line to define a pixel region P. In other words, the gate line and the data line 140 extend along boundaries of the pixel region P.

The data line 140 is connected to the source electrode. Namely, the TFT is connected to the gate line and the data line 140.

A passivation layer 114 is formed to cover the TFT and the data line 140 and includes a drain contact hole (not shown) exposing the drain electrode of the TFT.

The common electrode 116 and the pixel electrode 118 are formed on the passivation layer 114. The common electrode 116 and the pixel electrode 118 have a bar shape and alternately arranged.

A common contact hole (not shown), which exposes the common line, may be formed through the gate insulating layer 112 and the passivation layer 114, and the common electrode 116 may be connected to the common line through the common contact hole. The pixel electrode 118 is connected to the drain electrode through the drain contact hole.

In FIG. 4, the common electrode 116 and the pixel electrode 118 are alternately arranged and disposed on the passivation layer 118. However, a position and a shape of the common electrode 116 and the pixel electrode 118 are not limited thereto.

For example, the common electrode and the pixel electrode may be disposed in a different layer. In this instance, lower one of the common electrode and the pixel electrode may have a plate shape, and upper one of the common electrode and the pixel electrode may include at least one opening. Alternatively, the pixel electrode may be formed on the first substrate, and the common electrode may be formed on the second substrate.

The black matrix 150 and the color filter layer 160 are formed on the second substrate 120. The black matrix 150 has a lattice shape and includes an opening in correspondence to the pixel region P. Namely, the black matrix 150 is positioned to overlap the data line 140.

The color filter layer 160 is disposed in the opening of the black matrix 150. Namely, the color filter layer 160 corresponds to the pixel region P. For example, the color filter layer 160 may include a red color filter pattern 162, a green color filter pattern 164 and a blue color filter pattern 166.

In this instance, the data line 140 includes a plurality of lines along boundaries of each pixel region P, and the black matrix 150 also includes a plurality of lines corresponding to the plurality of lines of the data line 140.

Namely, a first distance "D1" between adjacent lines of the data line 140 is substantially equal to a second distance "D2" between adjacent lines of the black matrix 150, and a light leakage problem at a periphery of the data line 140 is prevented by the black matrix 150.

However, when the LCD device is curved, the data line 140 and the black matrix 150 are dislocated and do not overlap such that the light leakage problem is generated at the periphery of the data line 140.

As shown in FIG. 5, in the curved LCD device 100, the data line 140a and the black matrix 150a in a central region overlap, while the data lines 140b and 140c and the black matrixes 150b and 150c in the peripheral region are dislocated such that the data lines 140b and 140c are not covered by the black matrixes 150b and 150c, respectively.

Namely, there is no light leakage problem at peripherals of the data line 140a in the central region, while there is the light leakage problem at the peripherals of the data lines 140b and 140c in the peripheral region.

In the curved LCD device 100, since the length of the arc corresponding to the length of a surface of the second substrate 120 is smaller than the length of the arc corresponding to the length of a surface of the first substrate 110, the data lines 140, which are spaced apart from each other by the first distance D1, and the black matrixes 150, which are spaced apart from each other by the second distance being equal to the first distance D1, in a flat state are dislocated in the peripheral region.

In addition, since the data lines 140 and the black matrixes 150 are dislocated in the peripheral region, the light in one pixel region P passes through the color filter layer 160 in adjacent pixel region P. In other words, the color mixture problem is generated. ("B" part)

Moreover, the black matrix 150 is positioned in the pixel region P in the curved state, the transmittance of the curved LCD device is decreased.

On the other hand, the above problems can be overcome by increasing a width of the black matrix 150. However, the aperture ratio is decreased with increasing the width of the black matrix 150.

A curved LCD device being capable of preventing a color mixture problem, a light leakage problem and a transmittance decrease problem without aperture ratio decrease and a color filter substrate for the curved LCD device are explained.

Figure 6:
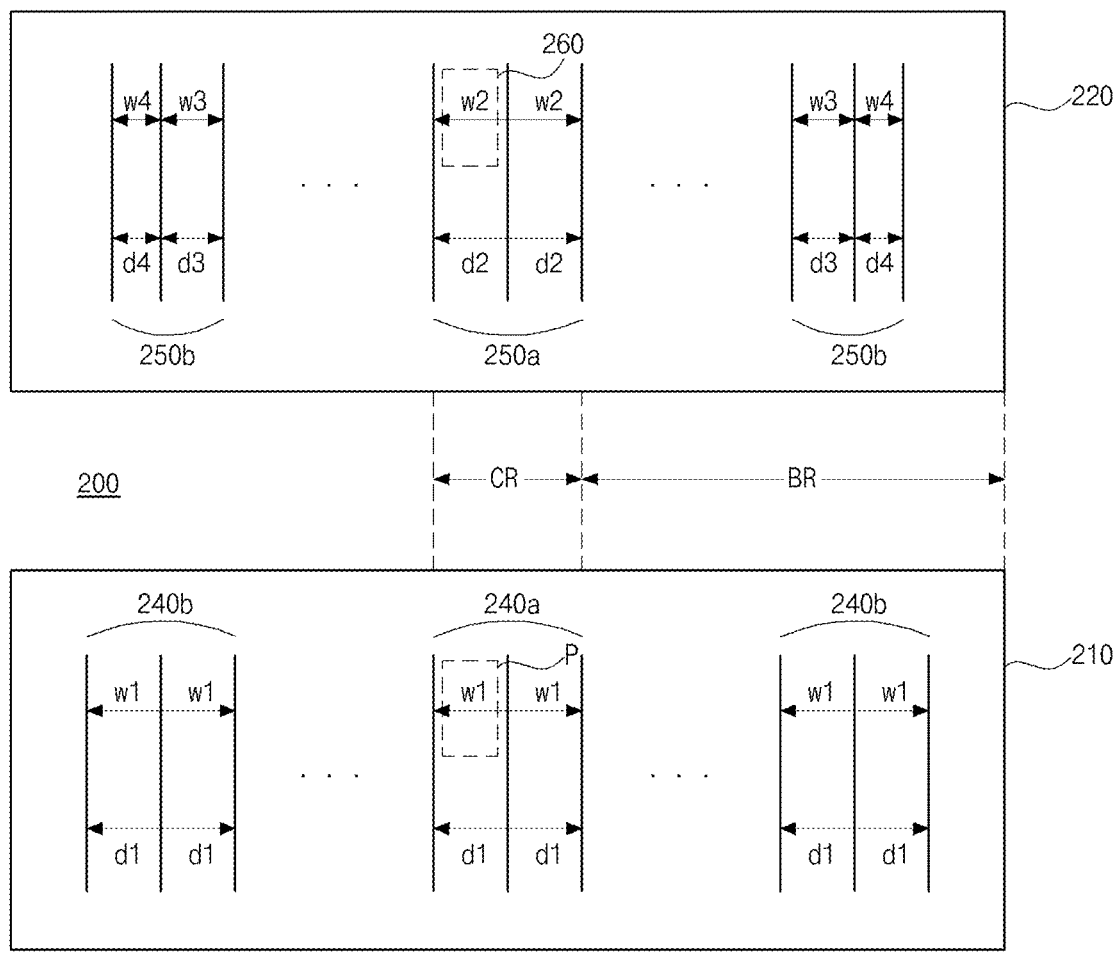
FIG. 6 is a schematic plane view showing a flat state of a curved LCD device according to a second embodiment of the present invention.

FIG. 6 is a schematic plane view showing a flat state of a curved LCD device according to a second embodiment of the present invention.

As shown in FIG. 6, a curved LCD device 200 according to the second embodiment of the present invention includes first and second substrates 210 and 220, which face each other, and a liquid crystal layer (not shown) therebetween. In the first and second substrates 210 and 220, a central region CR and a peripheral region BR are defined.

A plurality of data lines 240a and 240b are disposed along a vertical direction on the first substrate 210.

Although not shown, a plurality of gate lines, which cross the data lines 240a and 240b to define a plurality of pixel regions P, are disposed on the first substrate 210, and a TFT, which is connected to corresponding one of the data lines 240a and 240b and corresponding one of the gate lines, is disposed in each pixel region P. In addition, a plurality of pixel electrodes, which are connected to the TFT, are formed to be spaced apart from each other on the first substrate 210, and a plurality of common electrodes, which are alternately arranged with the pixel electrodes, are disposed on the first substrate 210. The first substrate 210 may be referred to as an array substrate.

The data line includes first data lines 240a in the central region CR and second data lines 240b in the peripheral region BR. The first and second data lines 240a and 240b are spaced apart from each other by the same distance.

Namely, all of the first and second data lines 240a and 240b have a first distance "d1", and each pixel region P, which is defined by the data lines 240a and 240b and the gate lines, has a first width "w1".

On the second substrate 220, a black matrix 250a and 250b, which extends to be parallel to the first and second data lines 240a and 240b and has an opening in correspondence to the pixel region P, and a color filter layer 160 (of FIG. 4) in the opening of the black matrix 250a and 250b are disposed. Although not shown, the black matrix 250a and 250b may include horizontal portions corresponding to the gate lines. The second substrate 220 including the black matrix 250a and 250b and the color filter layer 160 may be referred to as a color filter substrate. Alternatively, the color filter layer may be formed on the first substrate or emitted.

In this instance, the black matrix includes first black matrixes 250a in the central region CR and second black matrixes 250b in the peripheral region BR. The first black matrixes 250a have the same distance from each other, while the second black matrixes 250b have difference distances from each other.

Namely, the first black matrixes 250a in the central region CR are spaced apart from each other by a second distance "d2", which is substantially equal to the first distance "d1" between the data lines 240a and 240b, while the second black matrixes 250b in the peripheral region BR are spaced apart from each other by a third distance "d3" or a fourth distance "d4", each of which is smaller than the first distance "d1" between the data lines 240a and 240b.

In addition, a distance between the second black matrixes 250b in the peripheral region BR is proportionally decreased to a distance from the first black matrix 250a in the central region CR. (d3>d4) In other words, the second black matrixes 250b in the peripheral region BR are shifted toward the central region CR such that the distance between adjacent second black matrixes 250b is decreased from the central region CR to the peripheral region BR with respect to a curvature direction of the second substrate 220.

When the color filter layer 160 (of FIG. 4) including the red, green and blue color filter patterns 162, 164 and 166 (of FIG. 4) is formed in the opening of the black matrixes 250a and 250b, a width of the color filter layer 160 between the black matrixes 250a and 250b is decreased from the central region CR to the peripheral region BR.

Figure 7:
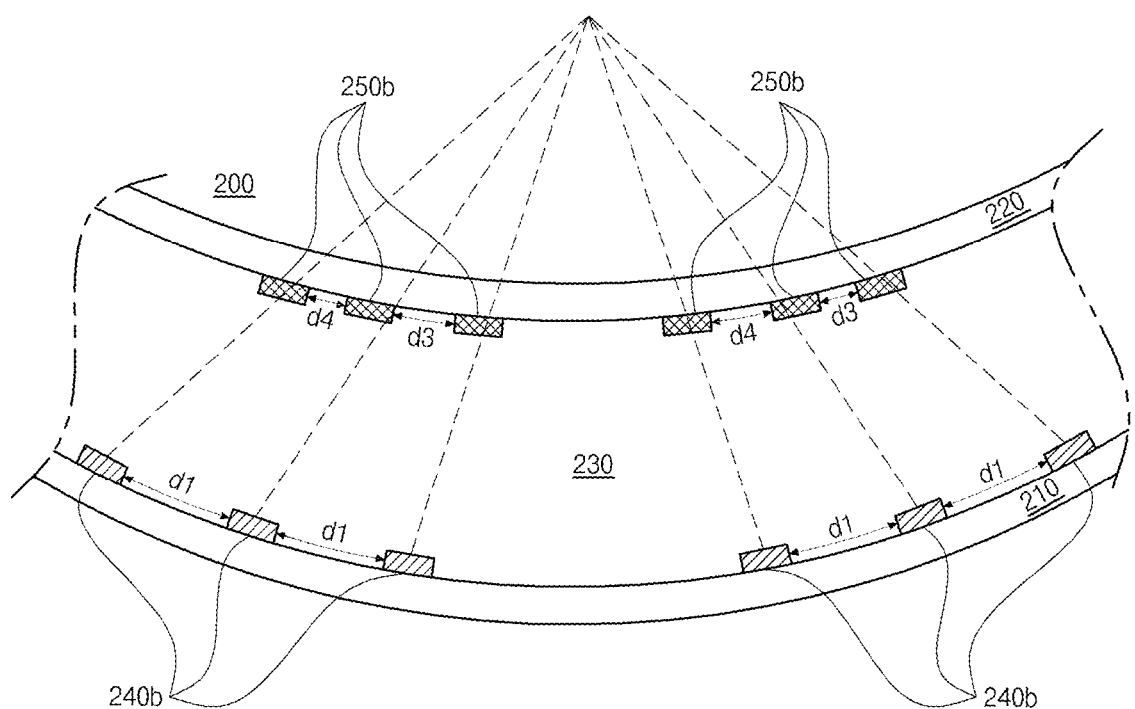
FIG. 7 is a schematic plane view showing a curved state of a curved LCD device according to the second embodiment of the present invention.

Namely, due to the different distance between the black matrixes 250a and 250b have a different distance, the color filter pattern in the central region CR has a second width "w2", which is substantially equal to the first width "w1" of the pixel region "P", while the color filter patterns in the peripheral region "BR" have a third width "w3" or a fourth width "w4", each of which is smaller than the first width "w1" of the pixel region P. (w3>w4) FIG. 7 is a schematic plane view showing a curved state of a curved LCD device according to the second embodiment of the present invention. The curved LCD device is provided by bending the flat LCD device in FIG. 6.

As shown in FIG. 7, in the curved LCD device 200, which is bent or curved by a pre-determined curvature, the arc length of the second substrate 220 with respect to an angel is smaller than the arc length of the first substrate 210 with respect to the angel.

Since the first distance "d1" between the second data lines 240b on the first substrate 210 in the peripheral region BR is larger than each of the third and fourth distances "d3" and "d4" between the second black matrixes 250b on the second substrate 220 in the peripheral region "BR", a difference between the arc lengths of the first and second substrates 210 and 220 is compensated such that the second black matrix 250b overlaps the second data line 240b.

Namely, the difference in the arc length, which is generated by the curvature of the curved LCD device, is compensated by the shift arrangement of the second black matrixes 250b such that the mis-alignment between the second black matrix 250b and the second data line 240b in the peripheral region BR is prevented. Accordingly, the light leakage at the periphery of the second data line 250b is not generated.

In addition, since the pixel region P and the color filter layer are accurately matched without the mis-alignment between the second black matrix 250b and the second data line 240b, the color mixture problem by the light in adjacent pixel region P is prevented.

Namely, by shifting the second black matrixes 250b in the peripheral region BR into the central region CR without increasing the width of the black matrixes 250a and 250b, the light leakage problem, the color mixture problem and the transmittance decrease problem are prevented.

Figure 8:
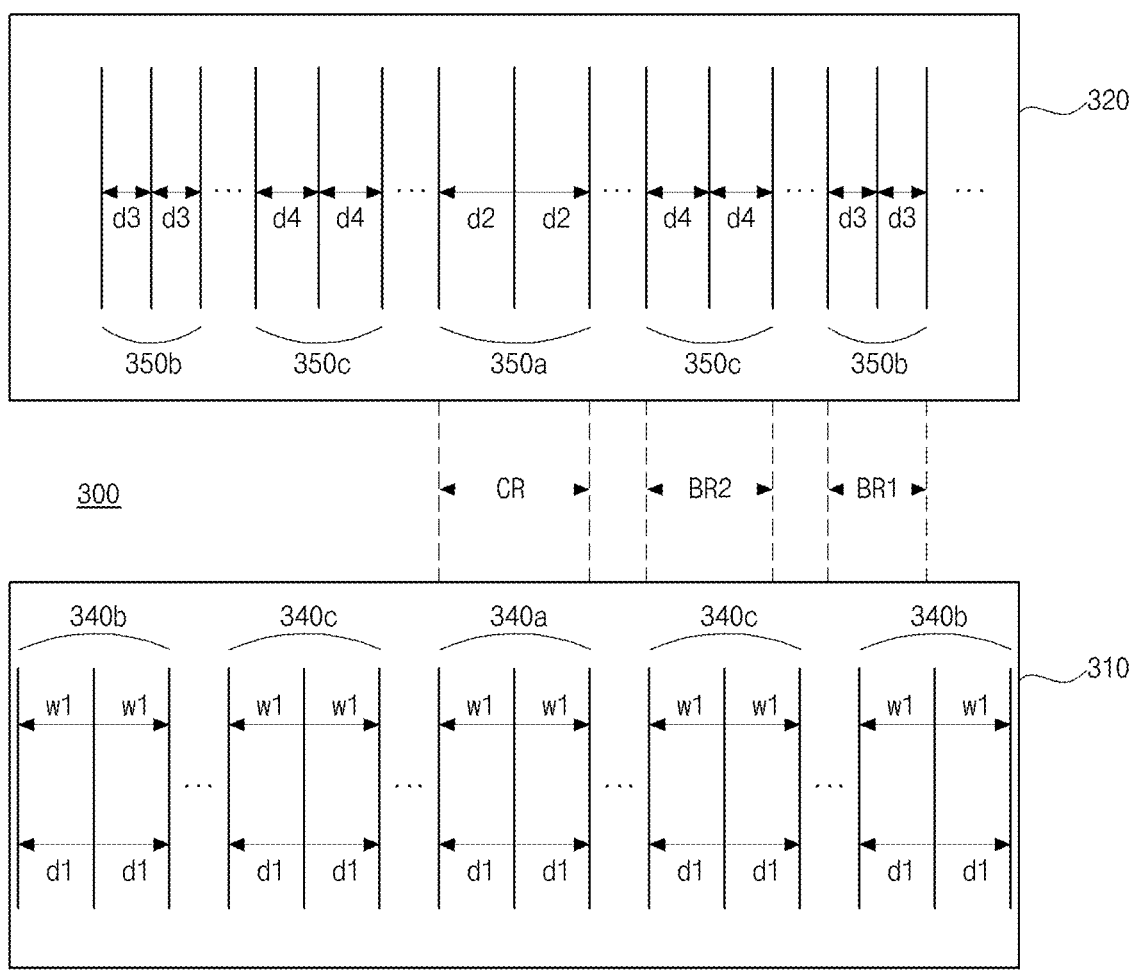
FIG. 8 is a schematic plane view showing a flat state of a curved LCD device according to a third embodiment of the present invention.

FIG. 8 is a schematic plane view showing a flat state of a curved LCD device according to a third embodiment of the present invention.

As shown in FIG. 8, a curved LCD device 300 according to the third embodiment of the present invention includes first and second substrates 310 and 320, which face each other, and a liquid crystal layer (not shown) therebetween. In the first and second substrates 310 and 320, a central region CR, a first peripheral region BR1 and a second peripheral region BR2, which is positioned between the central region CR and the first peripheral region BR1, are defined.

A plurality of data lines 340a, 340b and 340c are disposed along a vertical direction on the first substrate 310.

The data line includes first data lines 340a in the central region CR of the first substrate 310, second data lines 340b in the first peripheral region BR1 and third data lines 340c in the second peripheral region BR2. The first to third data lines 340a, 340b and 340c are spaced apart from each other by the same distance.

Namely, all of the first to third data lines 340a, 340b and 340c have a first distance "d1", and each pixel region P (of FIG. 6), which is defined by the data lines 340a, 340b and 340c and the gate lines, has a first width "w1" (of FIG. 6).

On the second substrate 320, a black matrix 350a, 350b and 350c, which extends to be parallel to the first to third data lines 340a, 340b and 340c and has an opening in correspondence to the pixel region P, is disposed.

The black matrix includes first black matrixes 350a in the central region CR, second black matrixes 350b in the first peripheral region BR1 and third black matrixes 350c in the second peripheral region BR2. The first black matrixes 350a have the same distance from each other, while the second and third black matrixes 350b and 350c have difference distances from each other.

Namely, the first black matrixes 350a in the central region CR are spaced apart from each other by a second distance "d2", which is substantially equal to the first distance "d1" between the data lines 340a, 350b and 340c, while the second black matrixes 350b in the first peripheral region BR1 are spaced apart from each other by a third distance "d3", which is smaller than the first distance "d1" between the data lines 340a, 340b and 340c. In addition, the third black matrixes 350c in the second peripheral region BR2 are spaced apart from each other by a fourth distance "d4", which is smaller than the second distance "d2" between the first black matrixes 350a and larger than the third distance "d3" between the second black matrixes 350b.

Namely, the second and third black matrixes 350b and 350c in the first and second peripheral regions BR1 and BR2 are shifted toward the central region CR such that the distance between adjacent third black matrixes 350c and the distance between adjacent second black matrixes 350b are decreased from the central region CR to an end of the second substrate 320 with respect to a curvature direction of the second substrate 320.

In the curved LCD device in FIGS. 6 and 7, the distance between the black matrixes 250a and 250b are gradually decreased from the central region CR to the peripheral region BR. On the other hand, in the curved LCD device in FIG. 8, the distance between the black matrixes 350*a*, 350*b* and 350*c* are stepwisely decreased. In other words, in the curved LCD device in FIG. 8, the distance between the black matrixes 350*a*, 350*b* and 350*c* in one of the central region CR, the first peripheral region BR1 and the second peripheral region BR2 is equal to each other.

When the color filter layer 160 (of FIG. 4) including the red, green and blue color filter patterns 162, 164 and 166 (of FIG. 4) is formed in the opening of the black matrixes 350*a*, 350*b* and 350*c*, the color filter layer 160 in the central region CR has a second width "w2", which is substantially equal to the first width "w1" of the pixel region P, and the color filter layers in the first and second peripheral regions BR1 and BR2 have a width being smaller than the first width "w1" of the pixel region P.

Namely, the width of the color filter layer between the black matrixes 350*a*, 350*b* and 350*c* is stepwisely decreased from the central region CR to the end of the second substrate 320. The width of the color filter layer in the second peripheral region BR2 is smaller than the width of the color filter in the central region CR and larger than the width of the color filter layer in the first peripheral region BR1.

When the flat LCD device is curved to provide the curved LCD device 300, a difference in the arc length generated by the curvature of the curved LCD device 300 is compensated by the shift arrangement of the black matrixes 350*b* and 350*c* such that a mis-alignment between the black matrixes 350*b* and 350*c* and the data lines 340*b* and 340*c* in the peripheral regions BR1 and BR2 is prevented. Accordingly, the light leakage at the periphery of the data lines 340*b* and 340*c* is not generated.

In addition, since the pixel region P and the color filter layer are accurately matched without the mis-alignment between the black matrixes 350*b* and 350*c* and the data lines 340*b* and 340*c*, the color mixture problem by the light in adjacent pixel region P is prevented.

Namely, by shifting the second black matrixes 350*b* and 350*c* in the peripheral regions BR1 and BR2 into the central region CR without increasing the width of the black matrixes 350*a*, 350*b* and 350*c*, the light leakage problem, the color mixture problem and the transmittance decrease problem are prevented.

Figure 9:
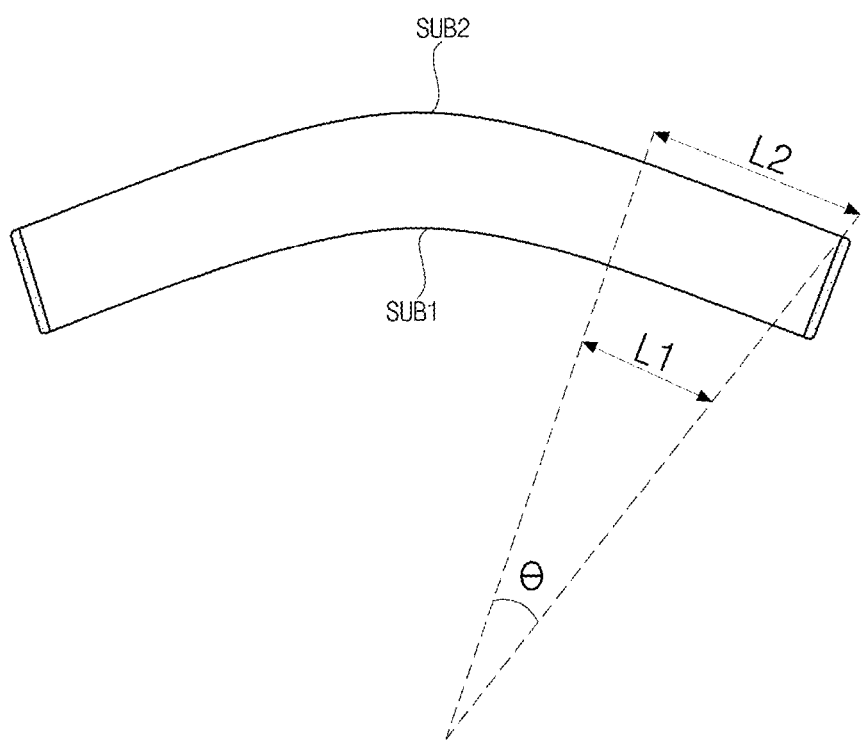
FIG. 9 is a schematic view explaining a shift arrangement of a black matrix in a curved LCD device.

With reference to FIG. 9, a shift arrangement of a black matrix in a curved LCD device is explained.

As shown in FIG. 9, in the curved LCD device, the arc length of an upper substrate "SUB1" is different from the arc length of a lower substrate "SUB2" with respect to a pre-determined angle "θ". Namely, a first arc length "L1" of the upper substrate "SUB1" is smaller than a second arc length "L2" of the lower substrate "SUB2" such that the problems, such as the color mixture, the light leakage, and so on, shown in FIG. 5 are generated.

To resolve the above problems, the black matrixes are shifted as shown in FIGS. 6 to 8. For example, the black matrixes are shifted by a half of the difference between the first arc length "L1" of the upper substrate "SUB1" and the second arc length "L2" of the lower substrate "SUB2" to prevent the mis-alignment between the black matrix and the data line.

Figure 10:
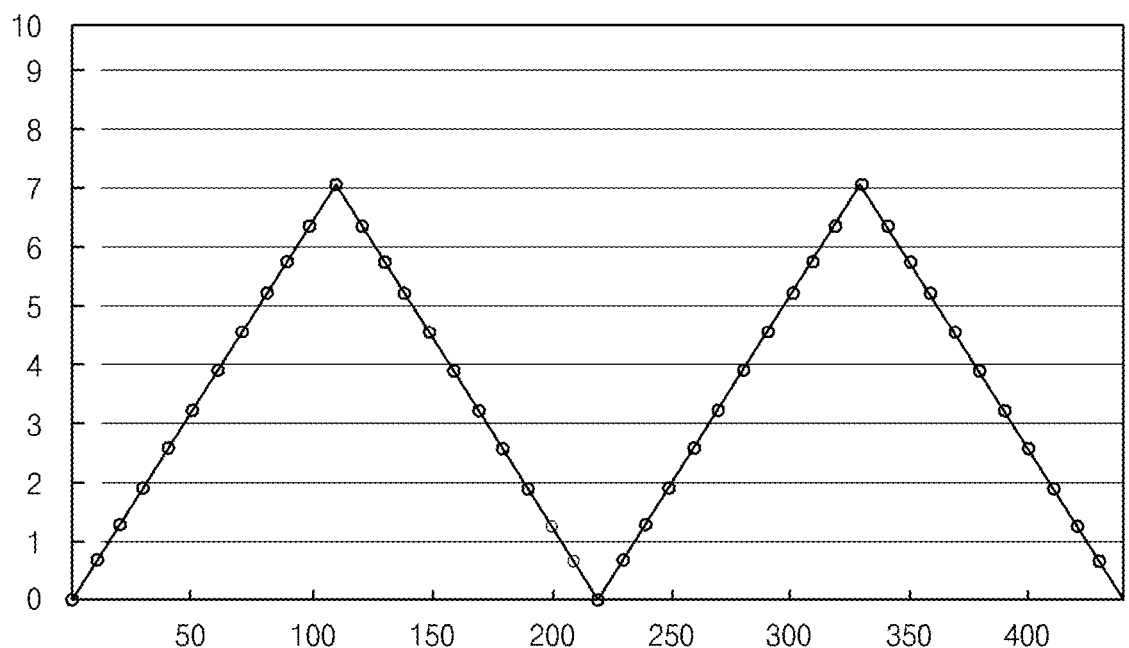
FIG. 10 is a schematic view explaining a shift principle of an upper substrate in a curved LCD device.

With reference to FIG. 10, which is a schematic view explaining a shift principle of an upper substrate in a curved LCD device, the shift range is maximized in a 1/4 point and a 3/4 point. In FIG. 10, the x axis is a position in the length direction of the substrate, and the y direction is a shift range in micrometer.

Accordingly, the shift of the black matrix for compensating the mis-alignment between the black matrix and the data line is conducted in consideration of the substrate shift principle.

Figure 11:
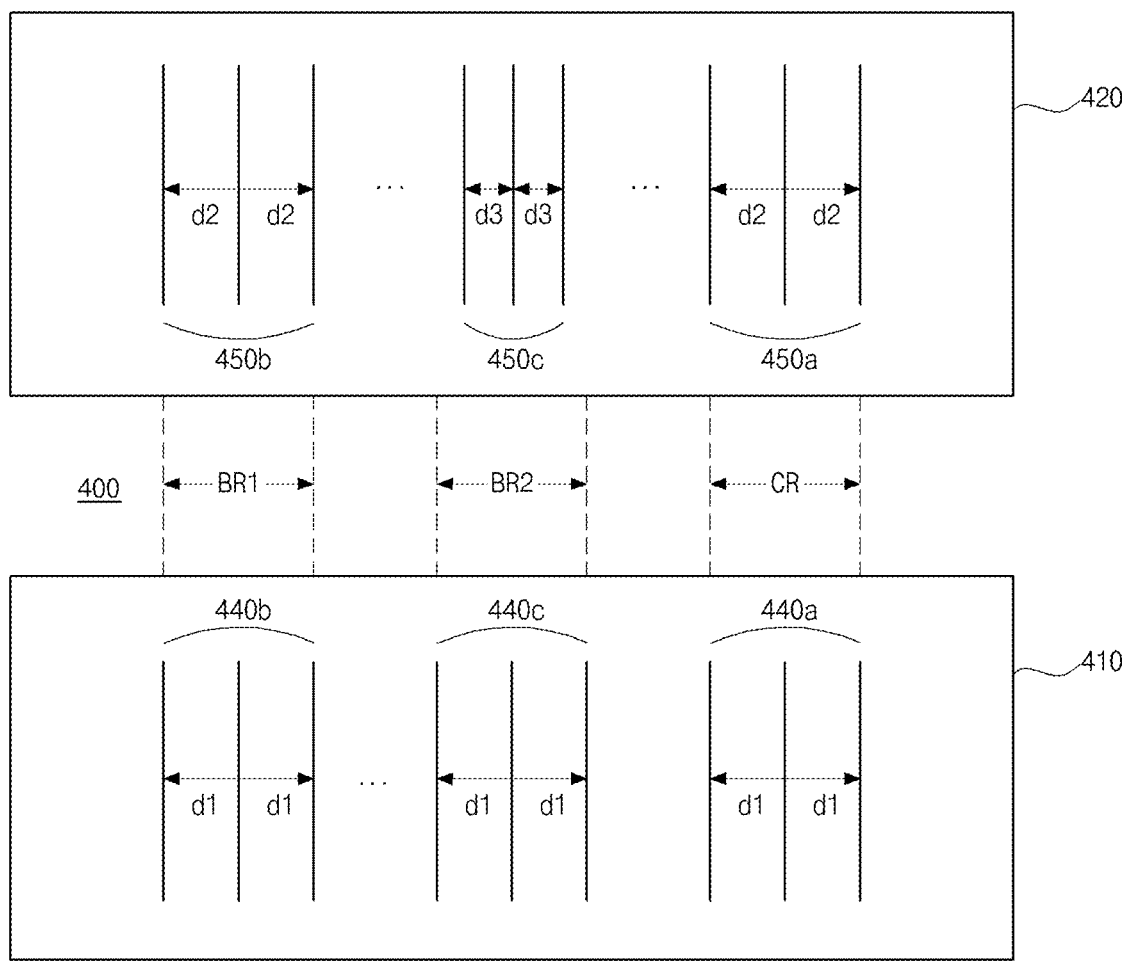
FIG. 11 is a schematic plane view showing a flat state of a curved LCD device according to a fourth embodiment of the present invention.

FIG. 11 is a schematic plane view showing a flat state of a curved LCD device according to a fourth embodiment of the present invention.

As shown in FIG. 11, a curved LCD device 400 according to the fourth embodiment of the present invention includes first and second substrates 410 and 420, which face each other, and a liquid crystal layer (not shown) therebetween. In the first and second substrates 410 and 420, a central region CR, a first peripheral region BR1 and a second peripheral region BR2, which is positioned between the central region CR and the first peripheral region BR1, are defined.

A plurality of data lines 440*a*, 440*b* and 440*c* are disposed along a vertical direction on the first substrate 410.

The data line includes first data lines 440*a* in the central region CR of the first substrate 410, second data lines 440*b* in the first peripheral region BR1 and third data lines 440*c* in the second peripheral region BR2. The first to third data lines 440*a*, 440*b* and 440*c* are spaced apart from each other by the same distance.

Namely, all of the first to third data lines 440*a*, 440*b* and 440*c* have a first distance "d1", and each pixel region P (of FIG. 6), which is defined by the data lines 440*a*, 440*b* and 440*c* and the gate lines, has a first width "w1" (of FIG. 6).

On the second substrate 420, a black matrix 450*a*, 450*b* and 450*c*, which extends to be parallel to the first to third data lines 440*a*, 440*b* and 440*c* and has an opening in correspondence to the pixel region P, is disposed.

The black matrix includes first black matrixes 450*a* in the central region CR, second black matrixes 450*b* in the first peripheral region BR1 and third black matrixes 450*c* in the second peripheral region BR2. The distance between the first black matrixes 450*a* in the central region CR is substantially equal to the distance between the second black matrixes 450*b* in the first peripheral region BR1 and different from the distance between the third black matrixes 450*c* in the second peripheral region BR2.

Namely, the first black matrixes 450*a* in the central region CR and the second black matrixes 450*b* in the first peripheral region BR1 are spaced apart from each other by a second distance "d2", which is substantially equal to the first distance "d1" between the data lines 450*a*, 450*b* and 450*c*, and the third black matrixes 450*c* in the second peripheral region BR2 are spaced apart from each other by a third distance "d3", which is smaller than the second distance "d2".

With reference again to FIG. 10, since the substrate of the curved LCD device has a maximum shift range at the regions between the center of the substrate and an end of the substrate, i.e., the 1/4 and 3/4 positions, the shift range of the black matrixes 450*a*, 450*b* and 450*c* is maximized at the second peripheral region BR2 between the center of the substrate and the end of the substrate.

Namely, the distance between the black matrixes is decreased from the central region CR to the second peripheral region BR2, and the distance between the black matrixes is increased from the second peripheral region BR2 to the first peripheral region BR1.

In addition, when the color filter layer 160 (of FIG. 4) including the red, green and blue color filter patterns 162, 164 and 166 (of FIG. 4) is formed in the opening of the black matrixes 450*a*, 450*b* and 450*c*, the color filter layer 160 has a second width "w2", which is substantially equal to the first width "w1" of the pixel region "P", in the central region CR and the first peripheral region BR1 and has a width, which is smaller than the first width "w1" of the pixel region, in the second peripheral region BR2 according to a distance variation of the black matrixes 450a, 450b and 450c.

In the curved LCD device, since the mis-alignment between the black matrixes 450b and 450c and the data lines 440b and 440c is further compensated, the light leakage problem, the color mixture problem and the transmittance decrease problem are prevented. In addition, since the black matrixes 450a, 450b and 450c have the same width, there is no decreased of the aperture ratio.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A curved liquid crystal display device, comprising:
   first and second substrates facing each other and including a central region, a first peripheral region and a second peripheral region at an outer side of the first peripheral region;
   a plurality of data lines disposed on the first substrate and being spaced apart from each other by a first distance;
   a plurality of gate lines disposed on the first substrate and crossing the plurality of data lines;
   a pixel electrode disposed on the first substrate;
   a common electrode on the first substrate or the second substrate;
   a black matrix disposed on the second substrate and including first black matrixes in the central region, second black matrixes in the first peripheral region and third black matrixes in the second peripheral region; and
   a liquid crystal layer disposed between the first and second substrates,
   wherein the first black matrixes are spaced apart from each other by a second distance, and the second black matrixes are spaced apart from each other by a third distance being smaller than the second distance,
   wherein the third black matrixes are spaced apart from each other by the second distance, and
   wherein a distance between adjacent data lines in the central region is the same as a distance between adjacent data lines in the first peripheral region and a distance between adjacent data lines in the second peripheral region.

2. The curved liquid crystal display device according to claim 1, further comprising:
   first to third color filters on the second substrate and in the central region and the first and second peripheral regions, respectively, wherein the first color filter has a width being substantially equal to the third color filter and being larger than the second color filter.

3. The curved liquid crystal display device according to claim 2, wherein a pixel region is defined by cross of the gate and data lines, and
   wherein the width of the first and third color filters is substantially equal to a width of the pixel region, and the width of the second color filter is smaller than the width of the pixel region.

4. The curved liquid crystal display device according to claim 1, further comprising:
   a thin film transistor on the first substrate,
   wherein the pixel electrode is connected to the thin film transistor.

5. A curved liquid crystal display device, comprising:
   first and second substrates facing each other and including a central region, a first peripheral region and a second peripheral region at an outer side of the first peripheral region;
   a plurality of data lines disposed on the first substrate and being spaced apart from each other by a first distance;
   a plurality of gate lines disposed on the first substrate and crossing the plurality of data lines;
   a pixel electrode disposed on the first substrate;
   a common electrode on the first substrate or the second substrate;
   a black matrix disposed on the second substrate and including first black matrixes in the central region, second black matrixes in the first peripheral region and third black matrixes in the second peripheral region; and
   a liquid crystal layer disposed between the first and second substrates,
   wherein the first black matrixes are spaced apart from each other by a second distance, and the second black matrixes are spaced apart from each other by a third distance being smaller than the second distance, and
   wherein the third black matrixes are spaced apart from each other by the second distance, wherein a plurality of pixel regions are defined by cross of the plurality of data lines and the plurality of gate lines, and
   wherein the pixel regions in the central region, the first peripheral region and the second peripheral region have the same width.

6. A curved liquid crystal display device, comprising:
   first and second substrates facing each other and including a central region, a first peripheral region and a second peripheral region at an outer side of the first peripheral region;
   a plurality of gate lines disposed on the first substrate;
   a plurality of data lines disposed on the first substrate and crossing the plurality of data lines;
   a pixel electrode disposed on the first substrate;
   a common electrode on the first substrate or the second substrate;
   a black matrix disposed on the second substrate and corresponding to the plurality of data lines;
   a color filter layer disposed on the second substrate and including a first color filter in the central region, a second color filter in the first peripheral region and a third color filter in the second peripheral region; and
   a liquid crystal layer disposed between the first and second substrates,
   wherein a first width of the first color filter is larger than a second width of the second color filter, and the third color filter has the first width,
   wherein a plurality of pixel regions are defined by cross of the plurality of data lines and the plurality of gate lines, and
   wherein the pixel regions in the central region, the first peripheral region and the second peripheral region have the same width.

7. The curved liquid crystal display device according to claim 6, further comprising:
   a thin film transistor on the first substrate,
   wherein the pixel electrode is connected to the thin film transistor.

8. A curved liquid crystal display device, comprising:

first and second substrates facing each other and including a central region, a first peripheral region and a second peripheral region at an outer side of the first peripheral region;

a plurality of data lines disposed on the first substrate and being spaced apart from each other by a first distance;

a plurality of gate lines disposed on the first substrate and crossing the plurality of data lines;

a pixel electrode disposed on the first substrate;

a common electrode on the first substrate or the second substrate;

a black matrix disposed on the second substrate and including first black matrixes in the central region, second black matrixes in the first peripheral region and third black matrixes in the second peripheral region;

first to third color filters on the second substrate and in the central region and the first and second peripheral regions, respectively, wherein the first color filter has a width being substantially equal to the third color filter and being larger than the second color filter; and a liquid crystal layer disposed between the first and second substrates, wherein the first black matrixes are spaced apart from each other by a second distance, and the second black matrixes are spaced apart from each other by a third distance being smaller than the second distance, wherein the third black matrixes are spaced apart from each other by the second distance, wherein a pixel region is defined by cross of the gate and data lines, and wherein the width of the first and third color filters is substantially equal to a width of the pixel region, and the width of the second color filter is smaller than the width of the pixel region.

* * * * *